(12) United States Patent
Saballus et al.

(10) Patent No.: US 10,452,425 B2
(45) Date of Patent: Oct. 22, 2019

(54) APPARATUS AND METHOD FOR PROCESSING A PLURALITY OF TASKS

(71) Applicant: Robert Bosch GmbH, Stuttgart (DE)

(72) Inventors: Bjoern Saballus, Remseck am Neckar (DE); Elmar Ott, Dorfprozelten (DE); Jascha Friedrich, Lohr am Main (DE); Juergen Bregenzer, Wuerzburg (DE); Simon Kramer, Leonberg (DE); Michael Pressler, Karlsruhe (DE); Sebastian Stuermer, Obersinn (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 15/794,276

(22) Filed: Oct. 26, 2017

(65) Prior Publication Data

US 2018/0121235 A1    May 3, 2018

(30) Foreign Application Priority Data

Nov. 3, 2016  (DE) .................. 10 2016 221 526

(51) Int. Cl.
*G06F 9/50*    (2006.01)
*G06F 9/48*    (2006.01)

(52) U.S. Cl.
CPC .......... *G06F 9/4818* (2013.01); *G06F 9/485* (2013.01); *G06F 9/4881* (2013.01); *G06F 9/5027* (2013.01); *G06F 9/5038* (2013.01)

(58) Field of Classification Search
CPC ............................ G06F 9/5027; G06F 9/5038
USPC .......................................................... 718/103
See application file for complete search history.

(56) References Cited

U.S. PATENT DOCUMENTS

| 8,397,236 B2 * | 3/2013 | Gibson ................ G06F 9/4881 718/100 |
| 2013/0191836 A1 * | 7/2013 | Meyer .................. G06F 9/4881 718/103 |
| 2014/0165070 A1 * | 6/2014 | Persikov .............. G06F 9/4881 718/103 |
| 2015/0106819 A1 * | 4/2015 | Kim ...................... G06F 9/5038 718/103 |
| 2016/0124770 A1 * | 5/2016 | Bouchard ............. G06N 7/005 718/103 |
| 2016/0217016 A1 * | 7/2016 | Raman ................. G06F 9/4806 |
| 2017/0024256 A1 * | 1/2017 | Mukherjee ........... G06F 9/5005 |
| 2017/0083377 A1 * | 3/2017 | Muthuvaradharajan ..................... G06F 16/24578 |

OTHER PUBLICATIONS

Saifullah, et al.; "Multi-core Real-time Scheduling for Generalized Parallel Task Models"; Real-Time Systems 49(4), 404-435; 2013 (Year: 2013).*

(Continued)

*Primary Examiner* — Anna C Deng
*Assistant Examiner* — Clint Thatcher
(74) *Attorney, Agent, or Firm* — Norton Rose Fulbright US LLP; Gerard Messina

(57) ABSTRACT

An apparatus and a method for processing a plurality of tasks in cycles on a plurality of computation cores, provision being made also to determine, within one cycle for processing the plurality of tasks, an allocation of the plurality of tasks to the plurality of computation cores and a sequence for an at least partial execution of the plurality of tasks.

18 Claims, 3 Drawing Sheets

(56) References Cited

OTHER PUBLICATIONS

Goossens et al.; "Priority-Driven Scheduling of Periodic Task Systems on Multiprocessors"; Real-Time Systems, 25, 187-205; 2003 (Year: 2003).*

Greenwald, et al.: "A Conditional Scheduling Approach to Designing Real-Time Systems", American Association of Artificial Intelligence, AIPS'98 Proceedings of teh 4th International Conference (1998), pp. 224-231.

Peng, et al.: "Timing Analysis and Conditional Scheduling in a Real-Time System Design Environment", Proceedings of the 6th Euromicro Workshop on Real-Time Systems (1994), pp. 214-219.

* cited by examiner

APPARATUS AND METHOD FOR PROCESSING A PLURALITY OF TASKS

CROSS REFERENCE

The present application claims the benefit under 35 U.S.C. § 119 of German Patent Application NO. DE 102016221526.4 filed on Nov. 3, 2016, which is expressly incorporated herein by reference in its entirety.

BACKGROUND INFORMATION

Microprocessors are used in embedded systems in order to perform calculations for processes. In embedded systems with real-time requirements, for example control systems, processes are assigned recurring time spans for calculation by the microprocessor. The length of the recurring time spans is preferably constant. The time spans repeat, for example, adjacently to one another in time. The time spans can also repeat with a preferably constant time interval from one another.

Processes can encompass a plurality of tasks that can be executed by way of the microprocessor. The microprocessor can at least partly execute one task or several tasks in one time span. A control program, which is referred to hereinafter as a "scheduler," assigns to various tasks of a process or to various tasks of different processes, by way of a schedule, a computation time on the microprocessor for performing the respective task. The schedule is a procedural plan that allocates to the respective tasks respective starting times, and optionally ending times, for execution.

Embedded systems can also be constructed as multiple-core computer systems. In this case a microprocessor of a multiple-core computer system encompasses two or more computation cores. A core allocation is specified in the schedule for the multiple-core computer system. The core allocation specifies in the schedule which task is performed on which of the computation cores.

The schedule is executed by the scheduler with the aid of a previously specified scheduling algorithm. After completion of the schedule, the sequence can if applicable start again from the beginning.

If static or dynamic dependences exist between tasks, the latter can be handled, for example sequentially, on one computation core. Performance of the corresponding calculations is thereby limited to a previously specified computation core.

Tasks can also be distributed by the scheduler to the various computation cores dynamically, i.e., only at runtime. Dynamically changing dependences between various tasks are activated in this context, for example, in event-controlled fashion. After activation, the sequence of distribution of the computation time is selected, by corresponding scheduling at runtime, in such a way that tasks which depend on the result of calculations in other tasks are the first to receive computation time. No consideration is given here, however, to real-time aspects, for example time limits for executing a specific task.

A real-time system must guarantee that a task is executed within a predefined time span. For "hard" real-time requirements, this is guaranteed in 100% of all cases.

Improved execution control in real-time systems is therefore desirable.

SUMMARY

An example method and an example apparatus in accordance with the present invention may offer improved execution control in particular for dynamically changing dependences of tasks.

A relevant method for processing a plurality of tasks in cycles on a plurality of computation cores also encompasses, within one cycle for processing the plurality of tasks (Ax1, . . . , Axn), determination of an allocation of the plurality of tasks to the plurality of computation cores, and determination of a sequence for an at least partial execution of the plurality of tasks. Tasks that serve in real-time systems to apply control to machines must be executed in a predefined sequence if the result of an execution of one task is used as an input variable for execution of another task. If the control application to the machine requires it, the execution of tasks must occur within one cycle, i.e., one specific time span, so that the control application can occur in timely fashion. In highly dynamic systems, the time span can have a duration of a few milliseconds. In order to execute many tasks in the time span, different tasks are calculated in distributed fashion on a plurality of computation cores. Thanks to the determination of the sequence, and the allocation within a cycle in which execution of the tasks occurs, the real-time system can modify, during its runtime, both the sequence and the allocation. This makes possible a flexible reaction to changes in the working sequence of the machine.

Advantageously, the sequence for a first cycle is determined before the at least partial execution of the plurality of tasks in the first cycle. Processing of the tasks is then accomplished already in the current cycle using the new sequence. This reduces reaction time in the context of changes in the working sequence of the machine.

Advantageously, the sequence for a first cycle is determined in a second cycle preceding the first cycle. This makes it possible to place the point in time for calculation of the new sequence within the second cycle, after processing of the tasks in the second cycle. This increases flexibility with regard to apportioning of computation time.

Advantageously, in the latter case the first cycle and the second cycle are immediately adjacent to one another in time. The first cycle thus directly follows the second cycle. The information regarding the new sequence is thus current in the first cycle.

Advantageously, ranks are allocated to the plurality of tasks, the rank of a task depending on the number of other tasks to be executed in the cycle before the task, and the sequence being determined as a function of a comparison of the ranks of the plurality of tasks. The tasks can be embodied to apply control to, or to model, parts of the machine. Provision can also be made to apply control to, or to model, several parts of a machine mutually dependently. In this case, input variables of a task depend on the output variables of other tasks. This dependence is expressed as ranks, which therefore also depend on the functional interaction of the parts of the machine. The sequence for processing the tasks can be determined quickly by comparing the ranks.

Advantageously, the plurality of tasks are sorted in accordance with their rank, and mutually independent tasks having the same rank are allocated to different computation cores. The sequence for processing the tasks can be determined in a short time by comparing the ranks. Allocation to different computation cores is accomplished in simple fashion for independent tasks of the same rank. The calculations for specification of the processing sequence and for allocation to computation cores thus occupies a minimum possible duration in a cycle. More time therefore remains within a cycle for processing the tasks, or the cycle can be shortened.

Advantageously, tasks having an identical rank are sorted as a function of information regarding a length of a runtime of the respective task. The runtime of a task can vary depending on a performance of a computation core. The runtime is specified, for example for normal operation of a computation core, as an average value or maximum value of the runtime. A sequence for tasks having an identical rank is specified quickly and reliably by sorting according to runtime.

With regard to the apparatus, a plurality of computation cores are provided for processing the plurality of tasks in cycles. A scheduler is embodied also to determine, within one cycle for processing the plurality of tasks (Ax1, . . . , Axn), an allocation of the plurality of tasks to the plurality of computation cores, and a sequence for an at least partial execution of the plurality of tasks.

A computer program in accordance with the present invention is furthermore embodied to carry out the example method. A example machine-readable memory can encompass such a computer program.

Further advantageous embodiments are described below and are shown in the figures.

DETAILED DESCRIPTION OF EXAMPLE EMBODIMENTS

Figure 1:
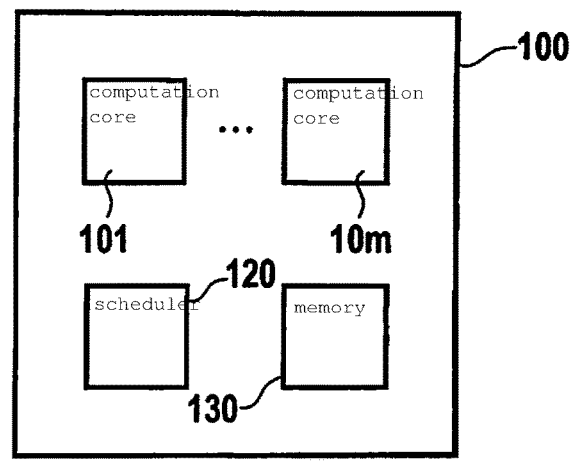
FIG. 1 schematically shows a microprocessor.

FIG. 1 schematically shows a microprocessor 100 having a plurality of computation cores 101, . . . , 10*m*. Microprocessor 100 encompasses an arbitrary number of computation cores, for example one or two computation cores. Preferably a computation core is one of several processor cores of the microprocessor. Various computation cores can also be provided in different microprocessors. Microprocessor 100 is preferably embodied to apply control to a machine. Microprocessor 100 is preferably the computer of an embedded real-time system that handles monitoring, open-loop control, or closed-loop control functions for the machine, or is responsible for a form of data processing or signal processing.

The microprocessor has an execution controller, in particular a scheduler 120, and a memory 130. Scheduler 120 can be implemented as software or as firmware. Scheduler 120 can run on a separate computation core or on one of the computation cores (101, . . . , 10*m*). Scheduler 120 controls the time sequence of the performance of several tasks on a computation core 101, . . . , 10*m* or several computation cores 101, . . . , 10*m* of microprocessor 100. Scheduler 120 can mark different tasks for performance on one of computation cores 101, . . . , 10*m* successively or on several of computation cores 101, . . . , 10*m* successively, in time-offset fashion, or simultaneously, i.e. in parallel with one another. Tasks can be marked for execution sporadically, i.e. in a manner triggered by events, cyclically, acyclically, or at specific points in time. Different tasks can be mutually dependent. This means that one task uses the result of the performance of another task as an input variable. These dependences can change dynamically, i.e. at runtime. "Marking for execution" means that the scheduler apportions computation time of one of computation cores 101, . . . , 10*m* to the process to which a task is allocated. The scheduler can apportion computation time to the process only for a specific time span, and withdraw it again after the time span expires. A specific task that is marked for performance on a specific computation core 101, . . . , 10*m* is executed, for example, within the next time span that was apportioned on the specific computation core 101, . . . , 10*m* to the process to which the specific task is allocated. The allocation of computation cores, and the determination of the sequence in which various tasks of a process are executed, are as described below. Provision can also be made to ascertain a sequence for executing tasks of various processes in this manner. In that case scheduler 120 is embodied additionally to mark the tasks for execution on one of computation cores 101, . . . , 10*m* as a function of a specific process to which the respective task is to be allocated.

From a known set of tasks whose dependences on one another can change dynamically, i.e. at runtime, a schedule for distribution among several computation cores 101, . . . , 10*m* is calculated as described below. Consideration is given in this context to the fact that generation of the schedule itself must also be accomplished with reference to real-time aspects. This means that after a change in a dependence, the new schedule must be generated in timely fashion, preferably before the next time span.

A time interval between respective starting times of successive time spans is referred to hereinafter as a "cycle time." The time span ends within the cycle time. The time span can be shorter than the cycle time. The time span can also begin later than the starting time within the cycle time. The cycle time is, for example, less than 1000 milliseconds, less than 100 milliseconds, less than 4 milliseconds, or less than 1 millisecond. The cycle time defines the length of a cycle.

The embedded real-time system can be used, for example, in a control device having firmware with which different tasks are executed during the cycle time in several computation cores. The control device controls, for example, a processing machine. The processing machine is, for example, a printing press, packaging machine, or machine tool. Processing machines of this kind have historically had master axes and slave axes mechanically coupled to one another. The motion of a slave axis can be derived from the motion of the master axis. Slave axes can themselves represent master axes for other slave axes. In modern processing machines this mechanical coupling no longer exists but instead is implemented by software. It is thereby possible to react more flexibly to changes. These dependences of the master axes and slave axes must nevertheless still be taken into account in software and calculated in real time, since otherwise the setpoints may not be made available in timely fashion and the machine may therefore fail or be defective.

In the example, the control device controls various axes of the processing machine. In the example, control application to a specific axis is allocated to a specific task. The role of an axis can change within a cycle, i.e. during the cycle time, or in general during the runtime, depending on the operating state of the machine. This means that an axis that was acting as a slave axis in one cycle can act as a master axis in the next cycle. This change must be taken into account, if applicable by the beginning of the next cycle, in a calculation sequence of the tasks in the control device. The schedule must therefore be modified in real time.

Dependences between tasks or between axes can be depicted, for example, as constraint graphs. In the initial state these are made up of nodes and undirected edges that represent a calculation relationship. The direction of those edges is specified depending on the operating state of the processing machine. The direction can thus change dynamically in real time, i.e. during the runtime of the operating machine. For this, for example, all possible operating states of the processing machine are specified statically and stored in the program, i.e. for example the firmware, in a memory in the control device. Switching between the operating states occurs during the runtime of the processing machine.

In the context of cyclic execution, a change in the dependences is preferably taken into account within the cycle time. This means that a new schedule is calculated at the runtime. As a result, it is not necessary to statically specify all possible operating states.

The end of the cycle time is the latest possible ending point in time of the time span, i.e., of the execution of a task. The new schedule must be specified and implemented no later than the start of the new time span, i.e. the beginning of execution of the next tasks. "Implemented" means that the respective tasks must be marked for execution in accordance with the new schedule. The runtime of the algorithm for generating the schedule is therefore short, preferably very much shorter than the cycle time.

At least memory 130 is provided in microprocessor 100 for data interchange among the tasks. Memory 130 is preferably a volatile memory. Provision can also be made for data interchange between a task and a nonvolatile memory. Data that are exchanged with the nonvolatile memory are preferably temporarily accessible by buffering in a corresponding region of memory 130.

Figure 2:
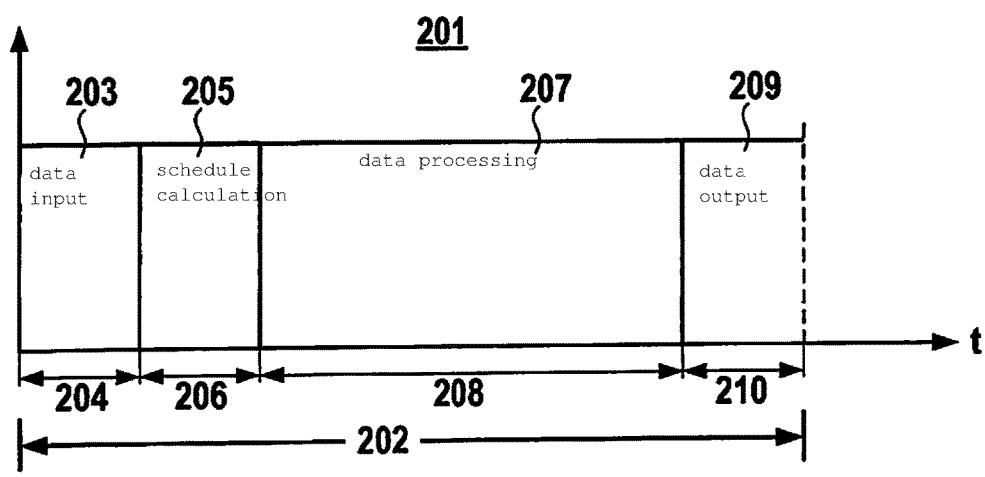
FIG. 2 schematically shows a time-related division of a time span.

Execution of a task marked as executable is started at the beginning of a time span. Execution of the tasks is preferably started in the time span following the point in time of their marking. FIG. 2 schematically shows a time-related division of a time span 201. In the example, cycle time 202 corresponds to the duration of time span 201.

After time span 201 starts, a data input 203 occurs, i.e. data necessary for execution of the task are read out from first memory 130. Data that are furnished by other tasks are already present in first memory 130 at this point in time. Intermediate results from an earlier partial execution of a task that is to be resumed can also be read. In the example, a first duration 204 of the data input is equal to one tenth of time span 201. A longer or shorter first duration 204 for data input 203 can also be provided.

Data input 203 is followed by schedule calculation 205. In the example, a second duration 206 of schedule calculation 205 is equal to one tenth of time span 201. A longer or shorter second duration 206 for schedule calculation 205 can also be provided for. Schedule calculation 205 will be explained in more detail below.

Schedule calculation 205 is followed by data processing 207. In the example, a third duration 208 of data processing 207 is equal to seven tenths of time span 201. A longer or shorter third duration 208 for data processing 207 can also be provided for. In data processing 207, at least one task is at least partly executed. Preferably all tasks marked for performance on computation core 101, . . . , 10*m* that is provided in the schedule for execution of the task are executed.

Before the end of time span 201 and subsequently to data processing 207, a data output 209 occurs, i.e. data necessary for execution of other tasks are written into first memory 130.

From this point in time on, data that are furnished for other tasks are present in first memory 130. Intermediate results for later resumption of the execution of a task can also be stored. In the example, a fourth duration 210 of data output 209 is one tenth of time span 201. A longer or shorter fourth duration 210 for data output 203 can also be provided for.

Provision can be made to read, at a later point in time, data that become necessary only during execution. Provision can be made to store in first memory 130, prior to data output, results that are already available before processing. Provision can be made to perform the execution of data input 203, of schedule calculation 205, of data processing 207, and/or of data output 209 in a different suitable sequence or with one or more interruptions.

The generation of a schedule will be explained below with reference to FIGS. 3 to 5. This generation takes place, for example, during schedule calculation 205.

A "plurality of tasks Ax1, . . . , Axn" hereinafter means any number of tasks, but at least two tasks. Tasks can preferably be distributed by the scheduler dynamically, i.e. at runtime, to one of the various computation cores 101, . . . , 10*m*.

In order to allow correct performance of a plurality of tasks Ax1, . . . , Axn whose dependences on one another can change dynamically, firstly a topological order is determined. An example of a topological order is depicted schematically in FIG. 3, as a dependence graph, for eight tasks Ax1, . . . , Ax8. The dependence graph depicts which of the eight tasks Ax1, . . . , Ax8 is calculated with or without a dependence.

Proceeding from tasks having no dependences, all further tasks along the dependences are collected and given a rank that corresponds to the number of tasks to be executed beforehand. A rank of 0 is allocated to tasks having no dependences. A rank of 1 is allocated to tasks that depend only on a task having a rank of 0. A rank of 2 is allocated to tasks that depend only on a task having a rank of 1, and so forth. In FIG. 3, the respective rank Rx is depicted to the left of the respective circle. In the example of the processing machine, a rank of 0 is allocated to a task that applies control to a master axis. The rank 1 is allocated to a task that applies control to a slave axis that is slaved only to the master axis. If the function of the axis changes depending on the operating state of the processing machine, the rank of the task likewise changes. Scheduler 120 is embodied in this case to detect the allocation of rank to task at the runtime of the processing machine. The individual tasks are, for example, allocated to a specific axis of the processing machine. Information regarding a current rank of an axis is stored, for example, in a table in first memory in microprocessor 100. In this case a task can itself detect the rank depending on the operating state of the processing machine, and cyclically store it. A coordination function, which stores this information in cyclically updated fashion, can also run in microprocessor 100.

Figure 3:
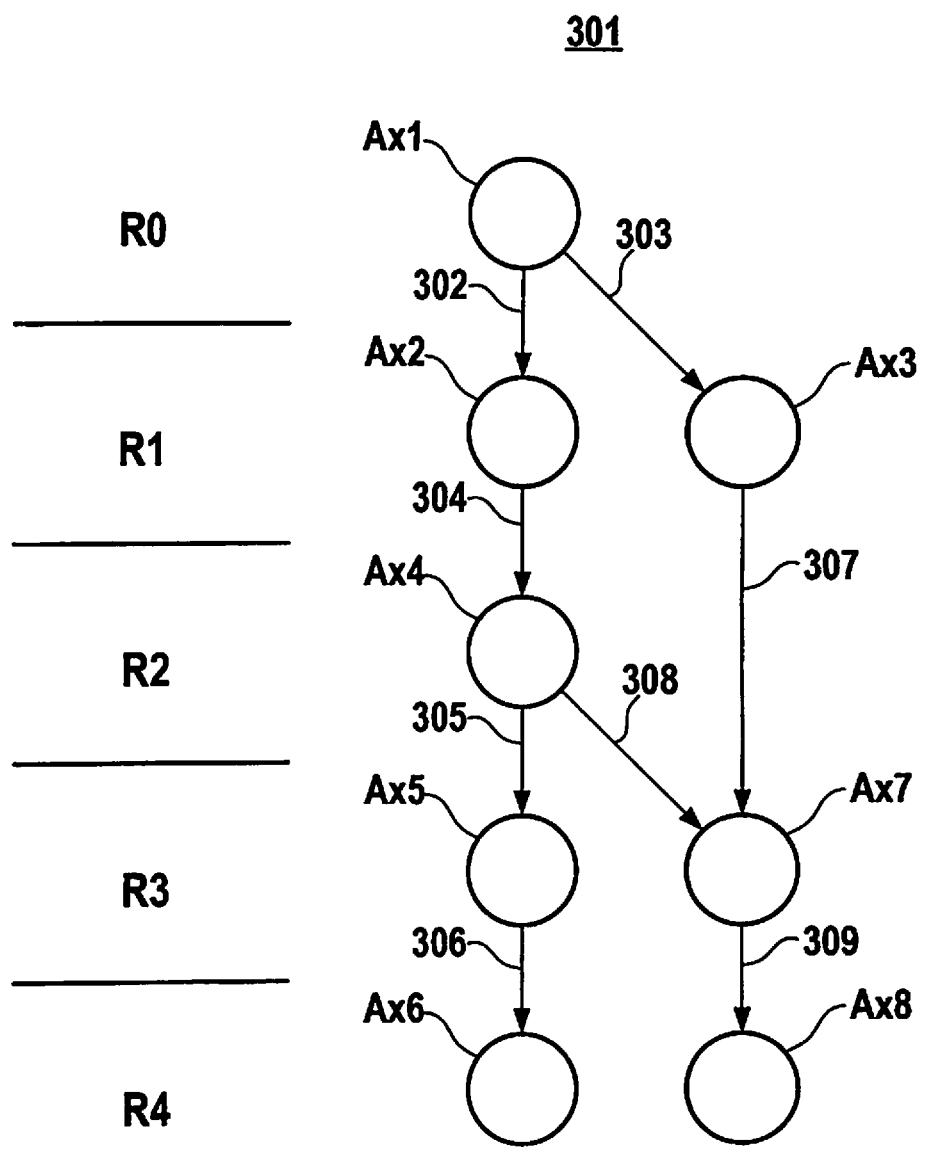
FIG. 3 schematically shows an example of a topological order for tasks.
Figure 4:
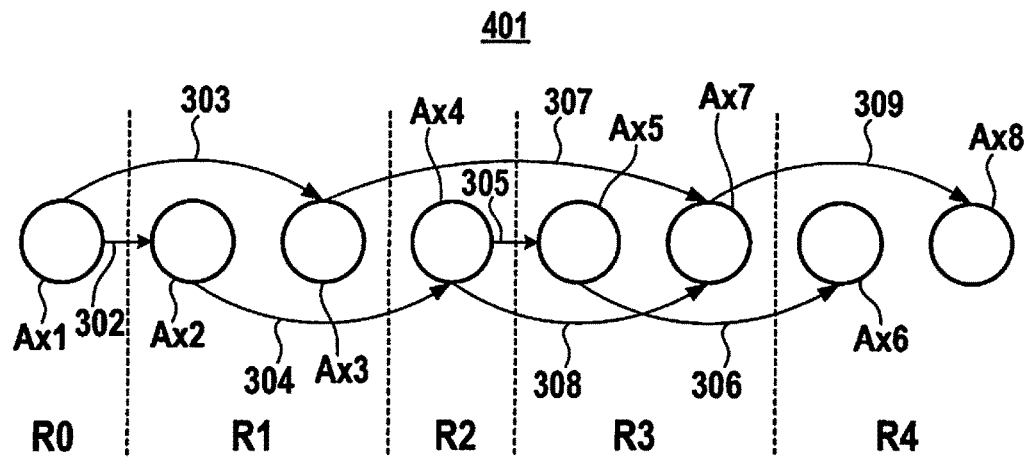
FIG. 4 schematically shows an execution sequence for one computation core.

The resulting dependence graph with ranks is depicted schematically in FIG. 3 as dependence tree 301. In FIG. 3, circles denote tasks. A first arrow 302 points from a first task Ax1 to a second task Ax2. This means that second task Ax2 uses the result of first task Ax1. A second arrow 303 points from first task Ax1 to a third task Ax3. This means that third task Ax3 depends on first task Ax1.

A rank R0 is allocated to first task Ax1, since it is independent of other tasks. A rank R1 is allocated to second task Ax2 and to third task Ax3, since these tasks are each dependent on only one task (first task Ax1).

A third arrow 304 points from second task Ax2 to a fourth task Ax4. In the example, the fourth task is dependent only on the result of second task Ax2. Second task Ax2 is dependent only on the result of first task Ax1. Fourth task Ax4 is thus dependent in total on the results of both results, both of first task Ax1 and of second task Ax2. The rank R2 is thus allocated to fourth task Ax4.

A corresponding procedure is used for the remaining tasks Ax5, . . . , Ax8. A fourth arrow 305 points from fourth task Ax4 to a fifth task Ax5. A rank R3 is allocated to fifth task Ax5. A fifth arrow 306 points from fifth task Ax5 to a sixth task Ax6. A rank R4 is allocated to sixth task Ax6. A sixth arrow 307 points from third task Ax3 to a seventh task Ax7. A seventh arrow 308 points from fourth task Ax4 to seventh task Ax7. Seventh task Ax7 thus depends on the result of four tasks (Ax1, Ax2, Ax3, Ax4). The rank R3 is allocated to seventh task Ax7. An eighth arrow 309 points from seventh task Ax7 to an eighth task Ax8. The rank R4 is allocated to eighth task Ax8.

All the tasks are then sorted according to their rank. This yields a valid execution sequence 401 for the individual computation core. This is depicted schematically in FIG. 4. As in FIG. 3, the circles represent the tasks, from left to right: Ax1, Ax2, Ax3, Ax4, Ax5, Ax7, Ax6, Ax8. The respective ranks are, from left to right: R0 for Ax1, R1 for Ax2, Ax3, R2 for Ax4, R3 for Ax5, Ax7, and R4 for Ax6, Ax6. The arrows that connect the same circles as in FIG. 3 are labeled in FIG. 4 with the same reference characters as in FIG. 3.

For utilization on multiple computation cores 101, . . . , 10m, this execution sequence 401 must be parallelized. In order to achieve maximally efficient utilization of computation resources, the parallel schedule is selected to be as short as possible, thus yielding a shortest possible execution duration. The objective is to minimize the sum of the duration of the scheduling operation (or sequence generation) and parallel execution, so that the sum is consequently much lower than linear execution on a single-core system.

A list schedule heuristic, for example best fit, is used, for example, in order to generate the schedule. It is advantageous in this context to sort the tasks Ax1, . . . , Axn not only by rank but also by runtime, since inefficient schedules can otherwise be created.

Preferable alternatives are:
1. Sorting the tasks by rank in the first step, then sorting each rank by runtime in the second step.
2. Simultaneously sorting the tasks in one step, by rank as a primary sorting criterion and by runtime as a secondary sorting criterion.

The runtime of a task can be both statically predefined and determined dynamically at runtime. A schedule can thereby be continuously optimized during execution.

A sorting algorithm, preferably Quicksort or BubbleSort, is used, for example, to sort a data volume using two sorting criteria.

Any other sorting algorithm that compares two elements with one another, and can thereby identify which is larger and which smaller, can be used. In the example, if the first sorting criterion with regard to rank is not identical, the result established is then that the task having the lower rank is inserted into the schedule earlier in time than the task having the higher rank. In the example, the second sorting criterion is compared only if the ranks are identical. If the second sorting criterion with regard to runtime is not identical, the result established is then that the task having the shorter runtime is inserted into the schedule before the task having the longer runtime. Alternatively, only one comparison is used. For this, a comparison criterion is created from the first and the second sorting criterion. For example, the first sorting criterion with regard to rank is in a first value range from 0 to 100. For example, the second sorting criterion with regard to runtime is in a second value range from 0 to 100 milliseconds. In this case, for each task the value of the second sorting criterion is multiplied by a factor of 1000 as a comparison criterion, and then added to the value of the first sorting criterion. An appropriate data type that has a suitable resolution is selected for this. Sorting then occurs in one step using one of the sorting algorithms referred to.

The result of the two alternatives referred to is the same. Alternative 2 has a shorter execution duration. Alternative 2 is therefore preferably used for runtime reasons.

Execution sequence 401 is distributed among the available computation cores 101, . . . , 10m using, for example, a best fit heuristic.

With the best fit heuristic, the tasks are marked serially, in accordance with the previous sorting, for execution on the best computation core that is currently available. The result for the example is schematically depicted in FIG. 5 as a list 501. In the example, the best currently available computation core is the computation core having the earliest possible starting time for a task. This type of heuristic is advantageous because it scales linearly with the number of elements. This means that the allocation of many tasks occurs quickly. The "best fit" heuristic is furthermore an allocation that is also suitable for a very large number of tasks. For example, first task Ax1 from execution sequence 401 is allocated to computation core 101 for execution because it can be allocated earlier than second computation core 102 for execution of first task Ax1. This represents the aforesaid "best fit." Instead of the earliest possible starting time, the computation core having the lowest utilization rate can also be marked for execution of the tasks.

In the example, first task Ax1 from execution sequence 401 is allocated to first computation core 101. This is repeated iteratively for the other tasks until the last task has been distributed.

Figure 5:
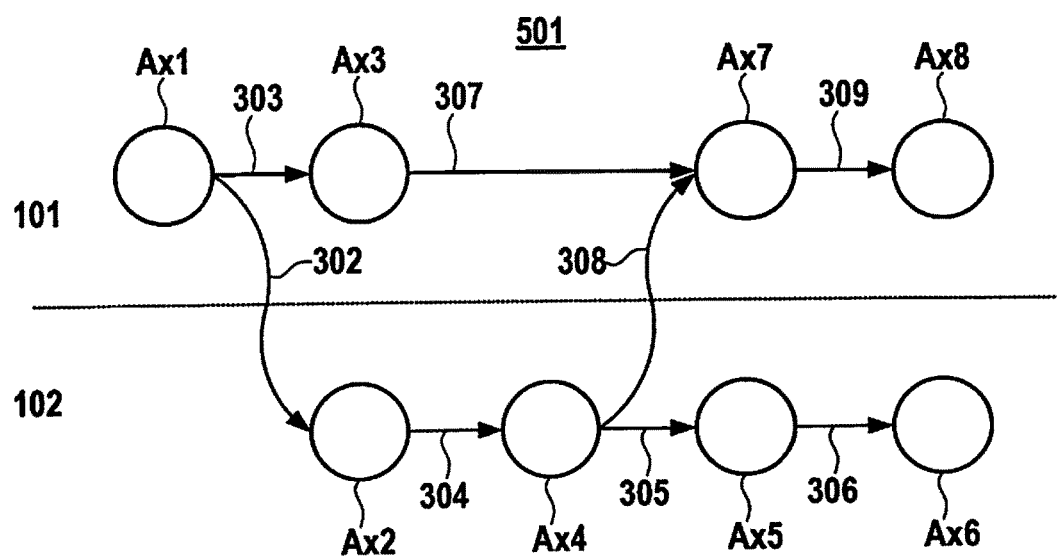
FIG. 5 schematically shows a schedule for two computation cores.

The result is that, in the example, list 501 depicted schematically in FIG. 5 is generated for two computation cores 101, 102. List 501 represents an exemplifying schedule that is created, in the example, in schedule calculation 205. As in FIG. 3, the circles represent tasks. The top row depicts the tasks allocated to a first computation core 101, from left to right: Ax1, Ax3, Ax7, Ax8. In the bottom row the tasks allocated to a second computation core 102 are depicted from left to right: Ax2, Ax4, Ax5, Ax6. In the example, the time sequence is selected so that it follows the sequence of ranks. In the example, the tasks run as follows from left to right: Ax1, then Ax2 and Ax3 in parallel, then Ax4, then Ax5 and Ax7 in parallel, then Ax6 and Ax8 in parallel. Instead of parallel execution, execution can also occur successively or with an overlap in time. The arrows that connect the same circles as in FIG. 3 are labeled in FIG. 5 with the same reference characters as in FIG. 3.

Synchronizations, which prevent a task from overtaking another task having a lower rank and thus disrupting conformity with the dependence, are preferably built in between the tasks having different ranks. This synchronization can be accomplished using spinlocks, semaphores, or barriers.

A spinlock protects a shared-use computation core, by mutual exclusion, from simultaneous access by competing tasks. Semaphores are provided, for example, as an additional data structure and allocate a computation core to a task using utilization operations ("reserve/test" and "release").

This ensures that at runtime, the generated schedule is executed simultaneously on all the available computation cores 101, ..., 10m, in order to minimize any waiting times due to delays and interruptions.

What is claimed is:

1. A method for processing a plurality of tasks in cycles on a plurality of computation cores, comprising:
    within one cycle for processing the plurality of tasks, allocating the plurality of tasks to the plurality of computation cores and determining a sequence for an at least partial execution of the plurality of tasks;
    wherein ranks are allocated to the plurality of tasks, the rank of each of the tasks being based on the number of other tasks to be executed in the cycle before the task, and the sequence being determined as a function of a comparison of the ranks of the plurality of tasks;
    wherein the other tasks to be executed in the cycle before the task include those of the plurality of tasks upon whose performance an input variable of the task depends;
    wherein the ranks are allocated in such a manner that the task of the plurality of tasks having a lowest number of other tasks upon whose performance the input variable of the task depends is allocated a highest rank, and the task of the plurality of tasks having a highest number of other tasks upon whose performance the input variable of the task depends is allocated the lowest rank;
    wherein the plurality of tasks are sorted and ordered in accordance with their ranks, the sequence being determined based on the sorted order of the plurality of tasks.

2. The method as recited in claim 1, wherein the sequence for a first cycle is determined before the at least partial execution of the plurality of tasks in the first cycle.

3. The method as recited in claim 1, wherein the sequence for a first cycle is determined in a second cycle preceding the first cycle.

4. The method as recited in claim 3, wherein the first cycle and the second cycle are immediately adjacent to one another in time.

5. The method as recited in claim 1, wherein mutually independent tasks of the plurality of tasks having the same rank are allocated to different computation cores.

6. The method as recited in claim 1, wherein those tasks of the plurality of tasks which have an identical rank are sorted as a function of information regarding a length of a runtime of the respective task.

7. An apparatus, comprising:
    a plurality of computation cores for processing a plurality of tasks in cycles; and
    a scheduler that determines, within one cycle for processing the plurality of tasks, an allocation of the plurality of tasks to the plurality of computation cores and a sequence for an at least partial execution of the plurality of tasks;
    wherein the scheduler allocates ranks to the plurality of tasks, the rank of each of the tasks being based on the number of other tasks to be executed in the cycle before the task, and the sequence being determined as a function of a comparison of the ranks of the plurality of tasks;
    wherein the other tasks to be executed in the cycle before the task include those of the plurality of tasks upon whose performance an input variable of the task depends;
    wherein the ranks are allocated in such a manner that the task of the plurality of tasks having a lowest number of other tasks upon whose performance the input variable of the task depends is allocated a highest rank, and the task of the plurality of tasks having a highest number of other tasks upon whose performance the input variable of the task depends is allocated the lowest rank;
    wherein the plurality of tasks are sorted and ordered in accordance with their ranks, the sequence being determined based on the sorted order of the plurality of tasks.

8. A non-transitory machine-readable memory on which is stored a computer program for processing a plurality of tasks in cycles on a plurality of computation cores, the computer program, when executed on a processing unit, causing the processing unit to perform:
    within one cycle for processing the plurality of tasks, allocating the plurality of tasks to the plurality of computation cores and determining a sequence for an at least partial execution of the plurality of tasks;
    wherein ranks are allocated to the plurality of tasks, the rank of each of the tasks being based on the number of other tasks to be executed in the cycle before the task, and the sequence being determined as a function of a comparison of the ranks of the plurality of tasks;
    wherein the other tasks to be executed in the cycle before the task include those of the plurality of tasks upon whose performance an input variable of the task depends;
    wherein the ranks are allocated in such a manner that the task of the plurality of tasks having a lowest number of other tasks upon whose performance the input variable of the task depends is allocated a highest rank, and the task of the plurality of tasks having a highest number of other tasks upon whose performance the input variable of the task depends is allocated the lowest rank;
    wherein the plurality of tasks are sorted and ordered in accordance with their ranks, the sequence being determined based on the sorted order of the plurality of tasks.

9. The method as recited in claim 1, wherein the dependency of the input variable of the task includes a direct and/or indirect dependence of the input variable of the task on an output variable of the other tasks to be executed in the cycle before the task.

10. The apparatus as recited in claim 7, wherein the dependency of the input variable of the task includes a direct and/or indirect dependence of the input variable of the task on an output variable of the other tasks to be executed in the cycle before the task.

11. The non-transitory machine-readable memory as recited in claim 8, wherein the dependency of the input variable of the task includes a direct and/or indirect dependence of the input variable of the task on an output variable of the other tasks to be executed in the cycle before the task.

12. The method as recited in claim 1, wherein dependencies between the plurality of tasks vary over time.

13. The method as recited in claim 1, wherein the sequence for the at least partial execution of the plurality of tasks is distributed among the plurality of computational cores using a best fit heuristic.

14. The method as recited in claim 1, wherein the method is used to control a processing machine having a plurality of axes, wherein control of each specific axis of the axes is allocated to a different specific task of the plurality of tasks.

15. The apparatus as recited in claim 7, wherein mutually independent tasks of the plurality of tasks having the same rank are allocated to different computation cores.

16. The apparatus as recited in claim 7, wherein those tasks of the plurality of tasks which have an identical rank are sorted as a function of information regarding a length of a runtime of the respective task.

17. The non-transitory machine-readable memory as recited in claim 8, wherein mutually independent tasks of the plurality of tasks having the same rank are allocated to different computation cores.

18. The non-transitory machine-readable memory as recited in claim 8, wherein those tasks of the plurality of tasks which have an identical rank are sorted as a function of information regarding a length of a runtime of the respective task.

* * * * *